Oct. 16, 1923.
S. ERDAHL ET AL
1,470,966
BEARING
Filed April 8, 1922
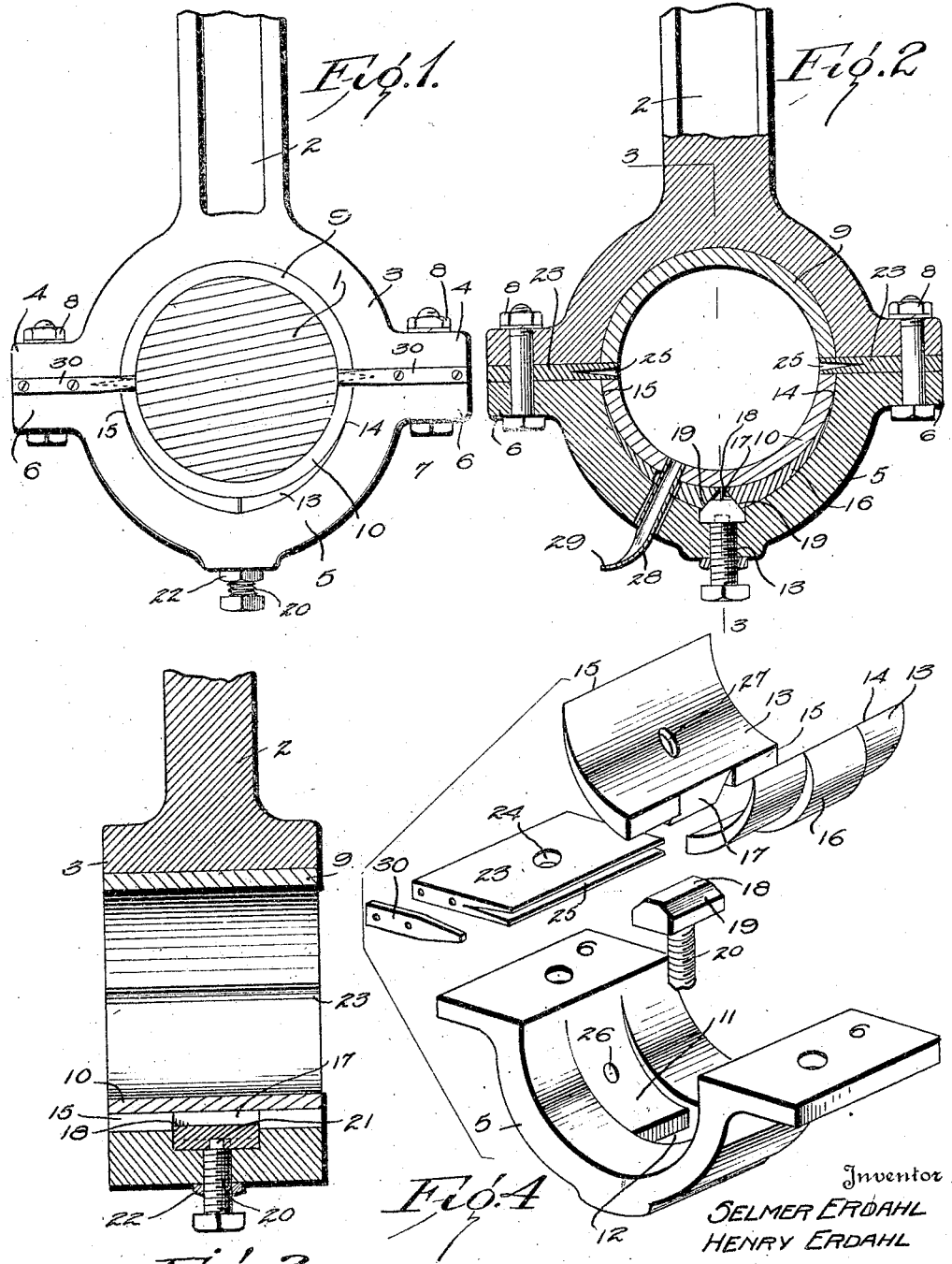

Patented Oct. 16, 1923.

1,470,966

UNITED STATES PATENT OFFICE.

SELMER ERDAHL AND HENRY ERDAHL, OF BRITTON, SOUTH DAKOTA.

BEARING.

Application filed April 8, 1922. Serial No. 550,833.

*To all whom it may concern:*

Be it known that we, SELMER ERDAHL and HENRY ERDAHL, citizens of the United States, residing at Britton, in the county of Marshall and State of South Dakota, have invented certain new and useful Improvements in Bearings, of which the following is a specification.

This invention relates to bearings, and more particularly to adjustable bearings.

An object of the invention is the provision of a bearing which may be adjusted or set up without removing the bearing caps.

A further object is the provision of a wedge adjusting member to permit tightening of the bearing without disassembling.

In the present invention, we employ a pair of wedges arranged between the bearing member and the cap, and a separating wedge adapted to move said wedge members to tighten the bearing when the separating wedge is moved inwardly. Any suitable mechanism may be employed for controlling the separating wedge.

In the accompanying drawings, we have shown one embodiment of our invention. In this showing:

Figure 1 is a side elevation of a bearing showing a shaft in section,

Figure 2 is a vertical sectional view of the bearing,

Figure 3 is a transverse sectional view on line 3—3 of Figure 2, and,

Figure 4 is a detail view of parts of the bearing removed.

Referring to the drawings, the reference numeral 1 designates a shaft, and 2 a connecting rod adapted to be secured thereto. The upper half of the bearing cap is carried by the connecting rod in the usual manner, as indicated at 3, and is provided with the usual flanges 4. A lower bearing cap 5 having flanges 6 is adapted to be secured to the connecting rod by means of bolts 7, passing through openings in the flanges 4 and 6. The bolts are retained in position by means of nuts 8. The upper bearing cap is of the usual construction and a bearing member 9 is arranged between the cap and the shaft. A similar member 10 is arranged between the lower cap and the shaft and this member is adjustable by means of suitable wedges which may be moved inwardly and outwardly to force the bearing member toward the shaft, or permit it to be withdrawn. As shown, the inner face of the lower bearing cap is provided with a circular groove 11 extending from flange to flange and tapering toward the bottom. The bottom of the groove communicates with a radial groove 12 and an opening 13 is arranged beneath the radial groove. The radial groove is substantially rectangular in shape. A pair of bearing wedges are arranged in the circular grooves 11. As shown, these members taper from a fine edge 14 at their upper ends to a relatively thick lower end 15. Each of the bearing wedges is provided with a rib 16 on its lower face adapted to be received in one of the grooves 11. The lower end of the rib is provided with an inclined face 17.

A separating wedge 18 is adapted to be arranged in the radial groove 12. This wedge is substantially rectangular in cross section and is provided with a pair of beveled or inclined faces 19 adapted to engage the inclined faces 17 of the bearing wedges. An adjusting screw or bolt 20 is arranged in the opening 13 and is provided with a nut 21 which is received in a recess in the lower face of the separating wedge. This screw may be retained in adjusted position by means of a lock nut 22. Spring shims 23 may be arranged between the flanges of the bearing cap. As shown, these shims are provided with openings 24 for the passage of bolts 7 and their inner ends are split, as at 25.

When a splash system of lubrication is employed, the lower bearing cap is provided with an opening 26 adapted to aline with an elongated opening 27 in the bearing wedge. The bearing member 10 is provided with an opening and a tubular member 28 is passed through these openings. The tubular member is provided with a grooved edge 29 adapted to more readily pick up oil and feed it to the bearing. When a force feed lubricating system is employed, the ends of the spaces 25 are closed by plates 30, adapted to be secured to the ends of the shims in any suitable manner.

The operation of the device is as follows:

The construction of the connecting rod and the integral portion of the bearing cap is the same as heretofore employed. The bearing wedges 13 are arranged in the grooves 11 and the separating wedge 18 is placed in the groove 12. The inclined faces 19 of the separating wedge engage the inclined faces 17 of the bearing wedges and by tightening the bolt 20, the bearing member 10 is moved toward the bearing by the spreading of the bearing wedges. As the bearing wedges are forced apart, the tapered ribs 16 ride upwardly in the grooves 11 and as the grooves taper toward the top, the wedges are forced inwardly to force the bearing member into engagement with the shaft. When the bearings have been sufficiently tightened, the lock nut 22 is fastened and the operation is completed. The bearing may be tightened at any time by merely loosening the lock nut and turning the bolt 20 without removing the bearing cap, as is necessary at the present time.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. An adjustable bearing comprising a pair of complementary members each having a substantially semicircular bearing member mounted therein, one of said complementary members forming a bearing cap, shims mounted between said complementary members and having their inner edges arranged between and contacting with the longitudinal edges of said bearing members, the inner edges of said shims being split longitudinally, and means for adjusting the bearing member of the bearing cap.

2. An adjustable bearing comprising a pair of complementary members each having a substantially semicircular bearing member mounted therein, one of said complementary members forming a bearing cap, shims mounted between said complementary members and having their inner edges arranged between and contacting with the longitudinal edges of said bearing members, the inner edges of said shims being split longitudinally, a pair of wedges arranged between said bearing cap and its bearing member and having their inner edges arranged adjacent each other, said wedges having arcuate eccentric inner and outer faces and being thickest at their adjacent edges, and means for separating the adjacent edges of said wedges.

In testimony whereof we affix our signatures in presence of two witnesses.

SELMER ERDAHL.
HENRY ERDAHL.

Witnesses:
HAROLD W. KING,
K. L. HICKS.